United States Patent [19]

McClellan et al.

[11] Patent Number: 5,216,627
[45] Date of Patent: Jun. 1, 1993

[54] METHOD AND APPARATUS FOR COMPUTING WITH TERMS HAVING UNITS

[75] Inventors: Paul J. McClellan; Eric L. Vogel; William C. Wickes, all of Corvallis, Oreg.

[73] Assignee: Hewlett-Packard Company, Palo Alto, Calif.

[21] Appl. No.: 645,860

[22] Filed: Jan. 25, 1991

[51] Int. Cl.⁵ ............................ G06F 1/00; G06F 7/38
[52] U.S. Cl. ............................. 364/700; 364/709.01; 364/715.05
[58] Field of Search ................... 364/700, 706, 709.01, 364/709.14, 709.07, 709.08, 715.05

[56] References Cited

U.S. PATENT DOCUMENTS

| | | | |
|---|---|---|---|
| 4,319,130 | 3/1982 | Spitzner | 364/715.05 |
| 4,530,068 | 7/1985 | Nakanishi et al. | 364/706 |
| 4,698,784 | 10/1987 | Abell | 364/706 X |
| 4,761,750 | 8/1988 | Yoshino et al. | 364/706 X |
| 4,811,257 | 3/1989 | Sumitani et al. | 364/706 X |
| 4,845,652 | 7/1989 | Bunsen | 364/709.14 |
| 4,881,189 | 11/1989 | Proctor | 364/715.05 |

*Primary Examiner*—Long T. Nguyen

[57] ABSTRACT

A method for performing unit conversion and managing units in mathematical computations. The method employs unit objects, which each have a scalar part and a unit part that together are treated as a single entity in computation. In the process of carrying out computations, the unit object operands of a particular operation are disassembled into their scalar and unit parts, new scalar and unit parts are calculated therefrom, and the new parts are combined to produce the new unit object. The method thereby simplifies computation involving physical quantities such as length and temperature and also aids in verifying that the computations are correct. To simplify the entry of the unit parts for unit objects, a unique user interface is provided.

17 Claims, 9 Drawing Sheets

| LENGTH | AREA | VOLUME | TIME | SPEED | MASS |
|---|---|---|---|---|---|
| FORCE | ENERGY | POWER | PRESSURE | TEMPERATURE | ELECTRICAL |
| ANGLE | LIGHT | RADIATION | VISCOSITY | | |

FIG. 8B

| PRESSURE | | | | | |
|---|---|---|---|---|---|
| Pa | atm | bar | psi | torr | mmHg |
| inHg | inH2O | | | | |

FIG. 10

```
← UNITS LENG
50  FT
45  FT
X
```

```
1:          2250_ft^2
M  CM  MM  YD  FT  IN
```

```
← UNITS TIME
3.2  D
÷
```

```
1:        703.125_ft^2/d
YR  D  H  MIN  S  HZ
```

FIG. 11

```
← UNITS
NXT FORCE
.4  LBF
11.9 DYN

+
```

```
2:            .4_lbf
1:          11.9_dyn
N  DYN  GF  KIP  LBF  PDL
```

```
1:    177940.76461_dyn
N  DYN  GF  KIP  LBF  PDL
```

12 ← UNITS VOL FT^3
← UNITS TIME → MIN

```
1:              12_ft^3/min
YR  D  H  MIN  S  H2
```

1 → LAST MENU NXT QT
→ LAST MENU → H

```
1:              12_ft^3/min
2:                    1_qt/h
YR  D  H  MIN  S  H2
```

→ UNITS CONV

```
1:      21543.8961039_qt/h
CONV UBASE UVAL UFACT →UNIT
```

FIG. 12

← UNITS
NXT PRESS
10 ATM

```
1:                    10_atm
PA  ATM BAR PSI TORR MMH
```

NXT ← INHG

```
1:         299.212598425_inHg
INHG INH2O
```

METHOD AND APPARATUS FOR COMPUTING WITH TERMS HAVING UNITS

BACKGROUND OF THE INVENTION

This inventions relates to method and apparatus for carrying out mathematical computations, such as with computers and calculating devices. More particularly, this invention relates to carrying out mathematical computations with terms that include a scalar part and a unit part such as length, mass, time, etc.

Mathematical computations often involve physical terms that have units such as a length, a temperature, a voltage, etc. In the process of carrying out a computation with multiple terms, units may be converted to a dimensionally consistent unit, such as inches to feet, or cancelled if the same unit appears in both the numerator and denominator of the final result. Conventional calculating devices such as calculators and computers are not equipped to manage physical units in mathematical computations. The manipulation of physical units is typically limited to providing conversion factors for converting a scalar associated with one type of unit to a scalar associated with another type of unit, such as converting 18 inches to 1.5 feet.

Mathematical computations involving physical units are thus split into two steps. First, one must write out the computations manually, usually with pencil and paper, and then resolve the units using conversion factors. Then a calculating device is used to perform the numerical calculations and the conversions. This two-step method is not only slow but is also prone to error. In attempting to resolve the units one can mistakenly combine dimensionally inconsistent units, such as inches and gallons, and not catch the error.

SUMMARY OF THE INVENTION

An object of the invention, therefore, is to provide an improved method of performing mathematical computations with terms having units which overcomes the drawbacks of prior methods.

A second object of the invention is to provide a calculating environment in which physically dimensioned quantities can be computed with the same operations and logic as scalar quantities.

A third object of the invention is to provide such a calculating environment in which dimensional consistency is automatically checked and maintained.

A fourth object of the invention is to provide a means for combining a scalar with a unit to create a single entity that may be used as a term in mathematical computations.

In accordance with these objects, a method in a calculating device of managing units in mathematical computation includes associating a scalar entry and a unit entry. In the present embodiment, they are combined to create a unit object having a scalar part and a unit part. In the present embodiment, the unit object is created from a character string entered into a calculating device. Syntactic elements of a unit object are identified within the character string, and a constituent object representing each syntactic element is provided in memory of the calculating device. The unit object is then created from the constituent objects.

In mathematical computation such as addition or multiplication, each unit object is first disassembled into its scalar part and unit part. A new scalar part is then calculated according to the computation from the scalar part of each unit object operand. A new unit part is also calculated according to the computation from the unit part of each unit object operand. The new scalar part and new unit part are then combined to create a new unit object representing the results of the computation.

To simplify computation with unit objects, a user interface for the calculating device may be provided. Creating a unit object then comprises entering a scalar part into a calculating device; displaying a units menu wherein each entry represents a type of unit; displaying a submenu of related units of a type selected from the units menu; and combining, in response to selection of a related unit, the entered scalar part with the selected related unit to complete the unit object.

The foregoing and other objects, features, and advantages of the invention will become more apparent from the following detailed description of a preferred embodiment which proceeds with reference to the accompanying drawings.

DESCRIPTION OF A PREFERRED EMBODIMENT

The following description is given in the context of a calculating device such as a calculator or computer. However, it will be appreciated by those skilled in the art that the invention to be described may be employed wherever it is desirable to perform mathematical computations with terms that have physical units.

The invention employs a data entity referred to hereafter as a "unit object," which has a scalar part and a unit part. For example the term "3_ft" is a unit object. The units may be of any type recognizable by the calculating device, such as predefined base units or user-defined additions to the base collection. Unit objects are entered and displayed in the format "number_units", where "number" is an ordinary real number and "units" is an algebraic expression containing unit names and one or more of the symbols *, /, ^, (, ). Predefined and user-defined unit names may be prefixed with letters to indicate powers of ten, such as "m" for milli and "p" for pico. Ambiguities between predefined units and units created with a prefix and a unit are resolved in favor of predefined units (e.g. "min" is minute, not milli-inch).

1. The Apparatus

Figure 1:
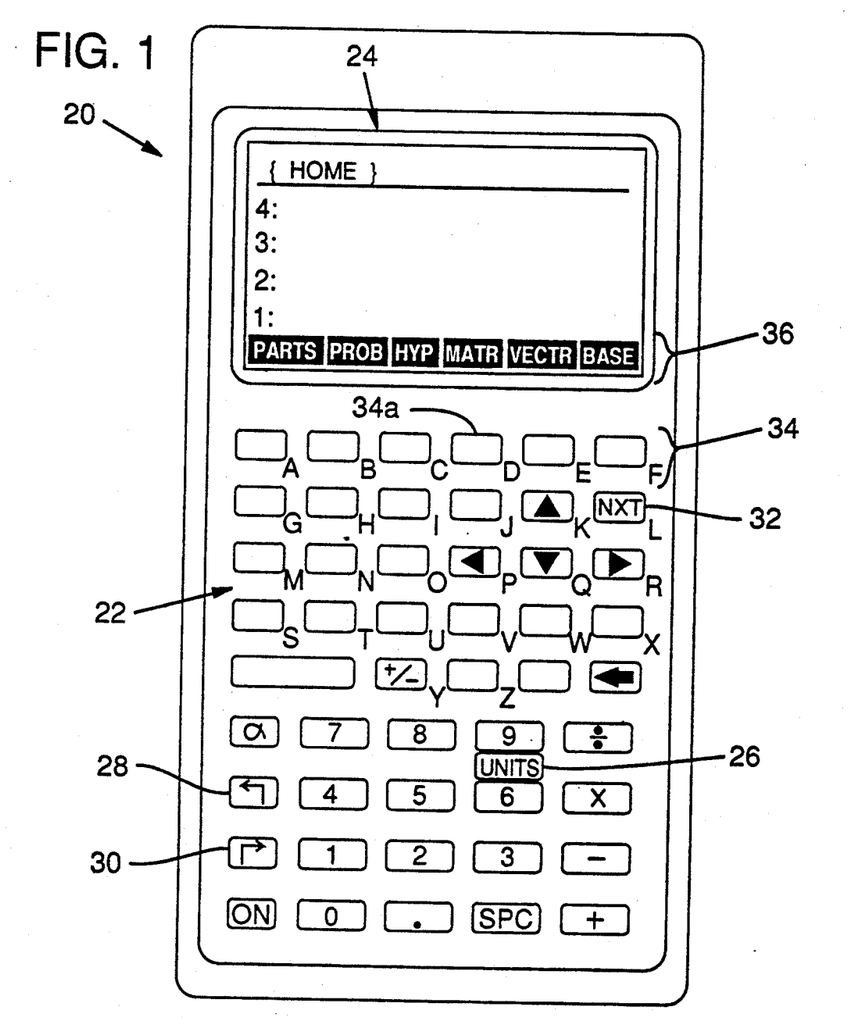
FIG. 1 is a pictorial view of a calculator as one embodiment of apparatus programmed according to the invention.

FIG. 1 shows a calculator 20 which is programmed to manage units in mathematical computations according to the invention. The hardware and architecture of the calculator 20 (shown in FIG. 2) may be of conventional design. The calculator includes an entry means such as a keyboard 22 and a display means such as an LCD display 24. On the face of the keyboard are a plurality of keys that each have a number of functions. Relevant to the present invention are several of the keys that have unique functions. A UNITS key 26 is used for activating a units menu in a shifted operation. The shift is accomplished by first pressing the left shift key 28. Other keys of note include a right shift key 30, a NXT key 32, and a row of menu keys 34. In response to activating the units menu, the menu keys are assigned to labels 36 that appear at the bottom of display 24, as will be further described hereafter.

Figure 2:
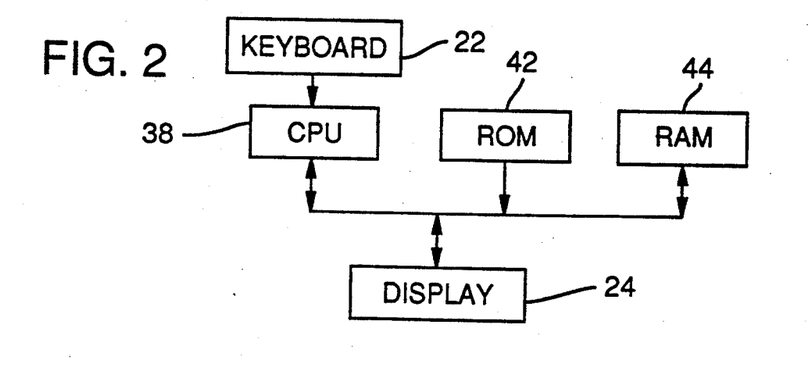
FIG. 2 is a block diagram of the architecture of the calculator of FIG. 1.

The architecture of calculator 20 includes a central processing unit (CPU) 38 to which are connected via various buses the keyboard 22, the display 24 and memory in the form of ROM 42 and RAM 44. The instructions for operating the CPU are written and stored in the ROM 42 in a conventional manner. The RAM 44 is available for storing data entered via the keyboard 22 and generated by the CPU 38 in the process of manipulating units according to the invention.

Of course, any equivalent calculating device may be used, such as a general purpose computer. Equivalent to the keyboard would be any data entry device such as a mouse. Equivalent to the LCD display would be any type of display device such as a CRT, hard copy device, etc.

2.0 The Structure of a Unit Object

In the present embodiment, a unit management program stored in the ROM 42 employs a data stack in the RAM 44 on which a multiplicity of data types can be placed. The program implements a unit object as a data-class composite object, containing atomic objects of several types representing the syntactic elements of the unit object. Operations pop their operands off the top of the data stack and return their results to the top of the data stack.

2.1 The Unit Object Parser

Figure 3:
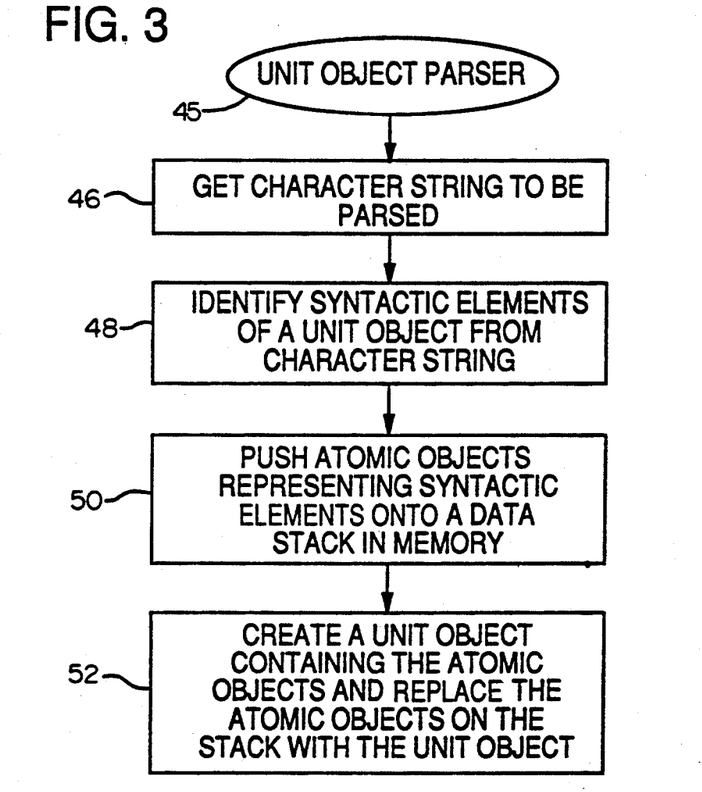
FIG. 3 is a flowchart of a method for creating a unit object.

Referring to FIG. 3, a unit object parser 45 within the unit management program takes a string representation of a unit object entered by a user via the keyboard 22 and creates a unit object from it. In the process, the parser identifies the syntactic elements of a unit object and pushes atomic objects representing these syntactic elements onto the stack. Table I, below, shows the syntactic elements of a unit object that are detected by the parser and their atomic object representation on the data stack:

TABLE I

| syntactic element | stack object(s) |
|---|---|
| <scalar> | scalar% |
| <prefix> | prefixC umP |
| <unit symbol> | push(unit$) |
| <exponent> | exponent% |
| "_" | umEND |
| "^" | um^ |
| "/" | um/ |
| "*" | um* |

The stack items umEND, um/, um*, um^ and umP are distinct pointers used by the unit management program. The stack items scalar% and exponent% represent real (floating point) objects containing the values of the scalar and exponent, respectively. The stack item prefixC represents a character object containing the prefix character. The stack item unit$ represents a string object containing the unit symbol.

FIG. 3 illustrates the steps taken by the parser 45 in creating unit objects, with each step indicated herein by a numeral in parentheses. The parser first gets the character string to be parsed, such as "3_ft", entered via the keyboard 22 (46). It then identifies the syntactic elements of a unit object from the character string (48). The parser then pushes atomic objects representing the syntactic elements onto the data stack (50). It finishes by creating a data-class composite object containing the constituent atomic objects and replacing these constituent objects on the stack with the newly constructed composite object, a unit object (52).

2.2 Unit Object Examples

The following examples illustrate the structure of a unit object. In these examples the unit object is listed as its atomic constituents enclosed in matching double colon (::) and semicolon (;). String objects are enclosed in double quotes (") and character objects are encoded in single quotes (').

| source string | unit object |
|---|---|
| "3_m" | :: 3.0 "m" umEND; |
| "3_cm" | :: 3.0 'c' "m" umP umEND; |
| "3_m^2" | :: 3.0 "m" 2.0 um^ umEND; |
| "3_N*m" | :: 3.0 "N" "m" um* umEND' |
| "3_m/s" | :: 3.0 "m" "s" um/ umEND; |
| "3_kg*m^2/s^2" | :: 3.0 'k' "g" umP "m" 2.0 um^ um* "s" 2.0 um^ um/ umEND; |

The unit management program distinguishes between a unit object and a general data-class composite object by the pointer umEND positioned at the end of the unit object.

3.0 Manipulation of Unit Objects

Unit management operations such as those described in the following sections receive their operands from and return their results to the data stack. Some of these operations need to manipulate the atomic constituents of one or more unit object operands. To do this, such an operation replaces a unit object operand by its constituent atomic objects and a trailing integer count serving as a delimiter of the atomic objects within a single unit object. After manipulating the atomic constituents, the operation then collects the remaining objects into a resultant unit object. Some operations accept both real and unit objects as operands. When both types of operands are present, these operations interpret a real operand as a unit object operand with the unit "1".

The method of managing units in a mathematical computation thus comprises the following steps. A user enters a character string into calculator 20 combining a scalar part and a unit part to create a unit object having a scalar part and a unit part. This may be repeated several times until the unit objects for the computation are created, such as the addition of two terms. Each unit object employed in the mathematical computation is then disassembled into its scalar part and unit part. The unit management program then calculates in accordance with the computation a new scalar part from the scalar part of each object. Similarly, the program calculates in accordance with the computation a new unit part from the unit part of each object. The unit management program then combines the new scalar part and new unit part to create a new unit object representing the results of the computation.

The detailed steps of the method for various computations are described below.

3.1 Assembling and Disassembling Unit Objects

A unit management operation (labeled EXTN in the present embodiment) creates a composite object from objects on the data stack by popping the first item from the stack, which is assumed to be an integer count N, popping the next N items, copying those N items into a data-class composite object, and pushing the newly created composite object to the stack. The unit management program uses this operation to construct a unit object from its atomic constituents by pushing an item count and then calling EXTN.

A unit management operation (labeled INNERCOMP in the present embodiment) replaces a unit object lying on the top of the data stack by its constituent object elements, followed by an integer count of the number of the constituent elements. The unit management program uses INNERCOMP to disassemble a unit object into its atomic constituents when that act is required.

The following sequence illustrates how a unit object is first destroyed, then recreated, using INNERCOMP and EXTN:

| EXTN: | |
|---|---|
| operation | stack contents |
|  | :: 2.0 "m" "s" um/ umEND; |
| INNERCOMP | 2.0 "m" "s" um/ umEND 5 |
| EXTN | :: 2.0 "m" "s" um/ umEND; |

3.2 Multiplying and Dividing Unit Objects

A unit management operation UM* multiplies two unit objects and returns a unit object product. Another operation UM/ divides two unit objects and returns a unit object quotient. These operations, to be described below, employ a structure known as a unit sequence.

The unit sequence of a unit object consists of the sequence of atomic elements of the object representing the unit part of that object, followed by an integer count of the number of those atomic elements. The unit sequence thus contains all of the atomic elements of the unit object except for the scalar real object and the pointer umEND. The following examples illustrate various unit sequences:

| unit object | unit sequence |
|---|---|
| :: 3.0 "m" umEND; | "m" 1 |
| :: 3.0 'c' "m" umP umEND; | 'c' "m" umP 3 |
| :: 3.0 "m" 2.0 um^ umEND; | "m" 2.0 um^ 3 |
| :: 3.0 "N" "m" um* umEND; | "N" "m" um* 3 |
| :: 3.0 "m" "s" um/ umEND; | "m" "s" um/ 3 |
| :: 3.0 'k' "g" umP "m" 2.0 um^ um* "s" 2.0 um^ um/ umEND; | 'k' "g" umP "m" 2.0 um^ um* "s" 2.0 um^ um/ 11 |

To simplify the computation, the unit part's numerator and denominator are manipulated separately during unit object multiplication and division. To do this, UM* and UM/ separate a unit sequence into numerator and denominator unit sequences, dropping the pointer um/. If a unit part does not have a denominator, the empty unit sequence, consisting of only the integer 0 is used. The following examples illustrate how a unit sequence is split into its numerator and denominator unit sequences:

| | |
|---|---|
| unit part | m |
| unit sequence | "m" 1 |
| numerator sequence | "m" 1 |
| denominator sequence | 0 |
| unit part | m/s |
| unit sequence | "m" "s" um/ 3 |
| numerator sequence | "m" 1 |
| denominator sequence | "s" 1 |
| unit part | kg*m^ 2/s^ 2 |
| unit sequence | 'k' "g" umP "m" 2.0 um^ um* "s" 2.0 um^ um/ 11 |
| numerator sequence | 'k' "g" umP "m" 2.0 um^ um* 7 |
| denominator sequence | "s" 2.0 um^ 3 |

To aid in the readability of data stack notation, the unit sequence stack notation is the sequence of items enclosed in square brackets ([]), omitting the integer count. For clarity, the sequence of items between brackets is replaced by a descriptive name. An empty unit sequence is represented by empty brackets, such as in the following examples:

| unit sequence | stack notation |
|---|---|
| 0 | [ ] |
| "m" 1 | [ "m" ] |
| "m" "s" um/ 3 | [ "m" "s" um/ ] |

Figure 4:
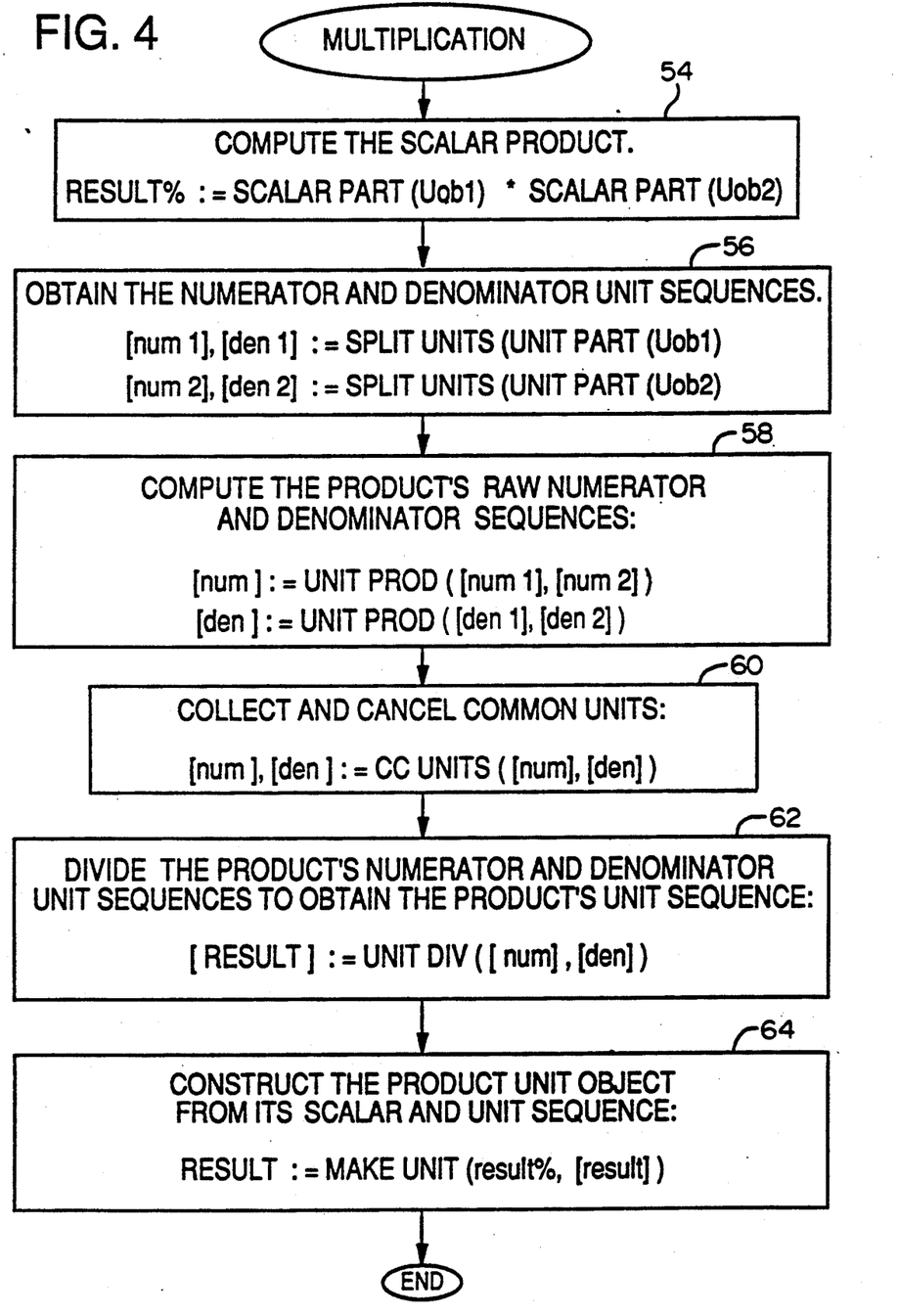
FIG. 4 is a flowchart of a method for multiplying two unit objects together.
Figure 5:
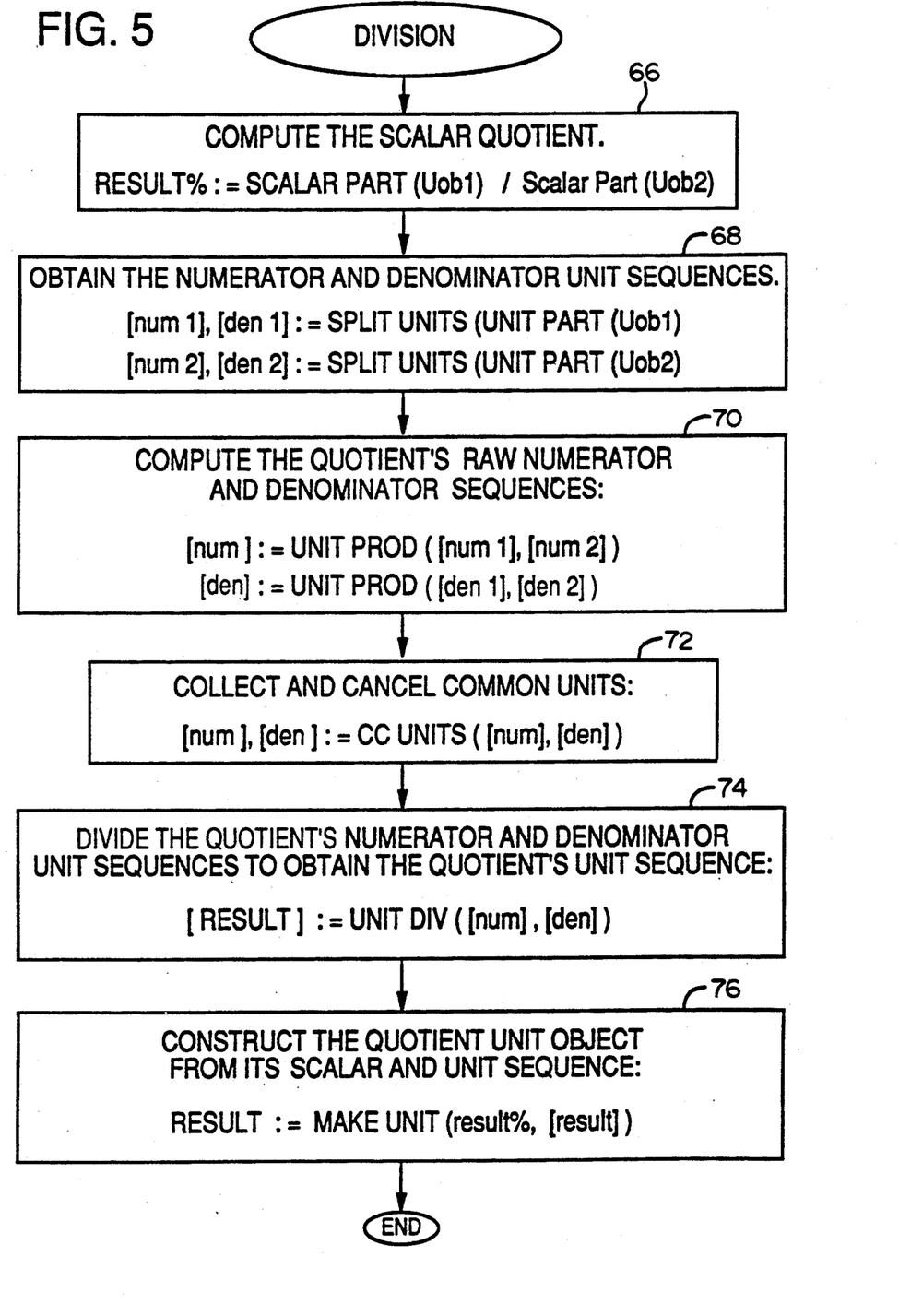
FIG. 5 is a flowchart of a method for dividing one unit object by another.

FIGS. 4 and 5 illustrate the method used by unit management operations UM* and UM/. Table II, below, includes internal procedures used by these two unit management operations:

TABLE II

ScalarPart (U)
returns the scalar part of a unit object.
UnitPart (U)
returns the unit sequence of a unit object. Given U on top of the stack, executes INNERCOMP, removes the scalar and umEND, and decrements the sequence count twice.
MakeUnit (%, [units])
creates a unit object from a scalar and a unit sequence. Given % and [units] on top of the stack, removes the sequence count, pushes umEND, pushes a new sequence count, and executes EXTN.
SplitUnits ([units])
splits a unit sequence into its numerator and denominator unit sequences.
UnitProd([s1], [s2])
multiplies two unit sequences and returns the resulting

TABLE II-continued unit sequence. Given [s1] and [s2] on top of the stack,
removes the sequence counts, pushes um*, and pushes a
combined sequence count. Assumes um/ does not appear in
either [s1] [s2].

UnitDiv [s1], [s2]

divides two unit sequences and returns the resulting
unit sequence. Given [s1] and [s2] on top of the stack,
removes the sequence counts, pushes um/, and pushes a
combined sequence count. Assumes um/ does not appear in
either [s1] or [s2].

CCUnits([num],[den])

collects and cancels common units among and between
numerator and denominator unit sequences. CCUnits is
described in more detail below.

Referring to FIG. 4, the multiplication operation is illustrated. With the two unit objects entered as operands, the scalar product is first computed (54) and the result is stored as an atomic object on the data stack. The numerator and denominator unit sequences are obtained from each unit object (56). The product's raw numerator and denominator sequences are computed (58). Units common to both the numerator and denominator sequences are collected and canceled (60) to reduce the sequences. To obtain the product's unit sequence, the numerator unit sequence is divided by the denominator unit sequence and then stored on the stack (62). The product unit object is then constructed from its scalar and unit sequence (64).

The division operation, illustrated in FIG. 5, is similar. The scalar quotient is computed from the scalar parts of the two unit object operands (66). The numerator and denominator unit sequences are obtained from each unit object (68). The quotient's raw numerator and denominator sequences are computed (70). Units common to both the numerator and denominator sequences are collected and cancelled (72) to reduce the sequences. To obtain the quotient's unit sequence, the numerator unit sequence is divided by the denominator unit sequence (74). The quotient unit object is then constructed from its scalar and unit sequence (76).

3.3 Collecting and Canceling Base Units

A base unit is either a predefined unit or a user-defined unit. It is desirable when multiplying or dividing units to collect together base units appearing in common in the numerator or the denominator unit expression, and to cancel base units appearing in both the numerator and denominator unit expressions. This improves the readability of the unit expression. For example:

| operand 1 | operand 2 | productquotient |
|---|---|---|
| 6_m/s | 2_s | 12_m3_m/s^ 2 |
| 4_m^ 2 | 2_m | 8_m^ 32_m |

The internal procedure CCUnits collects and cancels matching base units having common prefixes between a numerator and a denominator unit sequence.

A triple consists of three atomic elements corresponding to a prefix, base unit, and exponent. A special multiple sequence such as a triple sequence is a sequence of triples followed by a sequence count that corresponds to a numerator or denominator unit sequence. Each base unit in the unit sequence is represented in the triple sequence by its prefix character, base unit string, and exponent real objects found in the unit sequence. The sequence of these objects in the triple sequence is the same as that in the unit sequence. If a base unit has no prefix, a null string object is used in place of a prefix character object. If a base unit has no exponent a real number object, having the value one is used as its exponent. The other objects in the unit sequence (umP, um^, um*) are omitted. The stack notation for a triple sequence is similar to that for a unit sequence. For example:

| unit sequence | triple sequence |
|---|---|
| [ "m" ] | [ NULL$ "m" 1% ] |
| [ 'k' "g" umP ] | [ 'k' "g" 1% ] |
| [ "s" 2.0 um^ ] | [ NULL$ "s" 2.0 ] |
| [ 'k' "g" umP "m" 2.0 um^ um* ] | [ 'k' "g" 1% NULL$ "m" 2.0 ] |

Two triples match if they have equal prefix character and base unit string objects. A triple is distinct in a sequence if no other triple in the sequence matches it.

CCUnits first transforms its numerator and denominator unit sequences into triple sequences, collects and cancels matching triples within these triple sequences, and then transforms the resulting triples into unit sequences.

Figure 6:
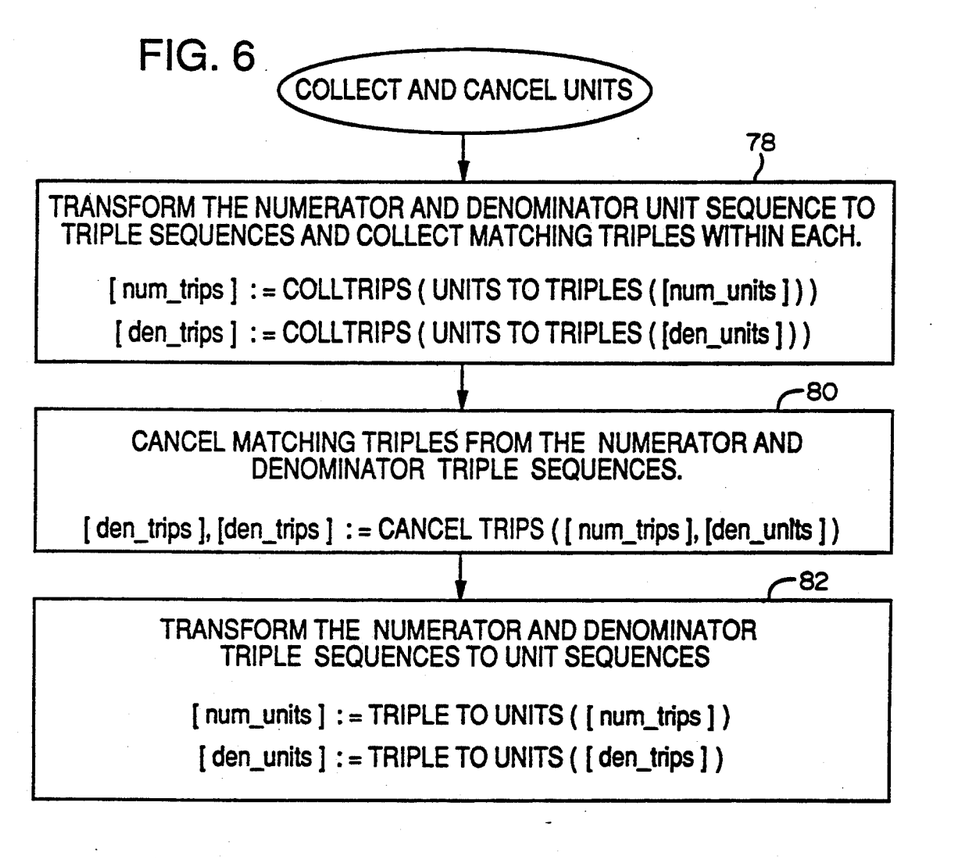
FIG. 6 is a flowchart of a method for collecting and cancelling like terms from the numerator and denominator of unit sequences.

FIG. 6 summarizes the method used by CCUnits. Table III, below, includes internal procedures used by this unit management operation:

TABLE III

UnitsToTriples([units])

returns a triple sequence representing a numerator or
denominator unit sequence. Removes base units "1" and
base units with zero exponents.

TriplesToUnits([triples])

returns a unit sequence represented by a triple
sequence. Drops null prefixes and exponents of 1.

CollTrips([triples])

collects matching triples in a triple sequence,
preserving the first order of appearance of each distinct
triple. This is done by repeatedly scanning the triple
sequence right to left searching for a match, adding the
exponent of the right-most matching triple to the left-
most, and dropping the right-most. All remaining triples
in the sequence are then distinct.

CancTrips([trips]), [trips2])

cancels matching triples from two triple sequences.
Assumes that all triples within either sequence are
distinct. The cancellation is done by scanning the second
sequence right to left taking each triple in turn as the
candidate triple to match in a right-to-left scan of the
first sequence. When a triple match is found, if their
exponents also match both triples are dropped from their
sequences. Otherwise, the matching triple having the
smaller exponent is dropped from its sequence and its
exponent is subtracted from the exponent of the other
matching triple. The order of appearance of the remaining
triples in each sequence is preserved.

FIG. 6 illustrates the steps for collecting and cancelling like units. The numerator and denominator unit sequences are first transformed into triple sequences and matching triples are collected (78). Matching triples from the numerator and denominator sequences are cancelled (80). The numerator and denominator sequences are then transformed into numerator and denominator unit sequences (82).

3.4 Arithmetic Operations Requiring Unit Consistency

Many arithmetic operations in mathematical computation require that the units of each operand or term be dimensionally consistent. For example, three feet cannot be added to, subtracted from or compared meaningfully to three gallons. To check for dimensional consistency, a unit table is maintained internally for each unit. Each table entry includes the unit name, conversion factor to SI units, and quantity data that defines the base unit types comprising that unit. The table is organized such that unit names with the same length are grouped together for faster access.

The quantity data with the unit table provides for checking dimensional consistency. For example, to verify that gallons can be converted to acre*ft, the quantity data for each unit must be compared. Gallons is a volume unit, and volume is derived from three length units multiplied together. Acre*ft is the product of an area and a length. Since an area is the product of two lengths, acre*ft represents a three-length unit, and is therefore consistent with any other volume unit, including gallons.

Figure 7:
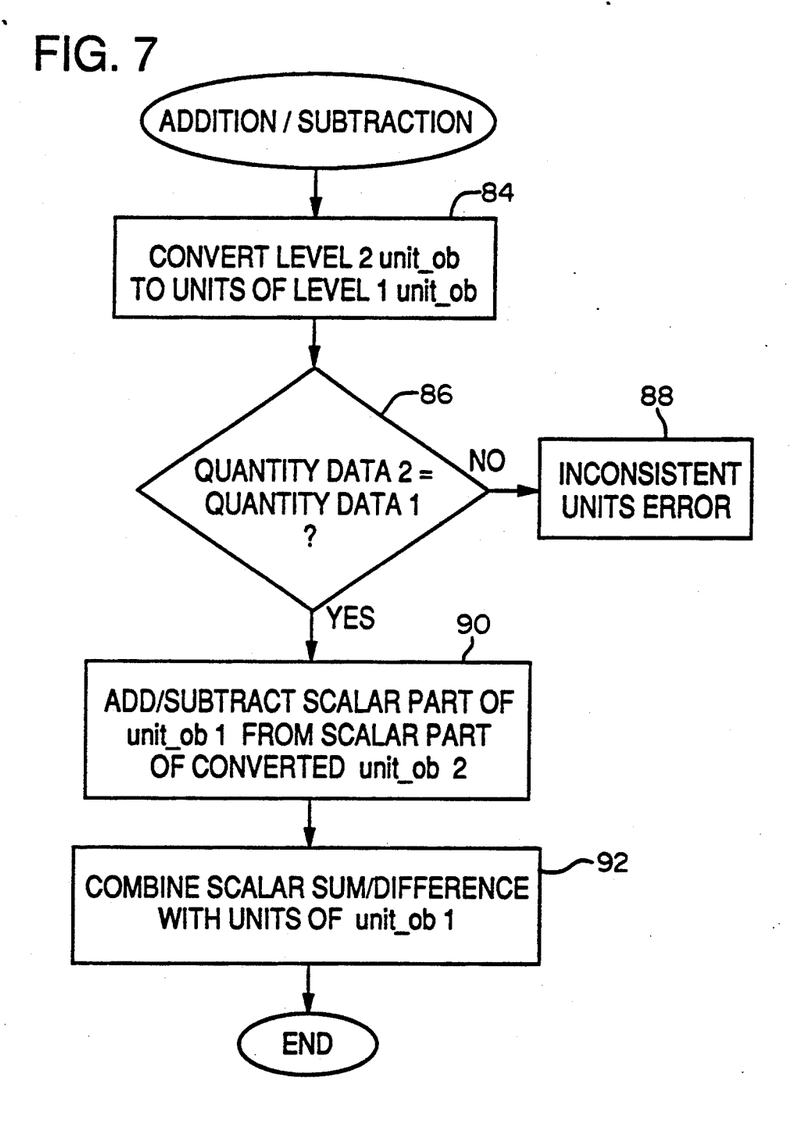
FIG. 7 is a flowchart of a method for adding/subtracting two unit objects.

FIG. 7 illustrates a method performing such arithmetic operations while checking for the dimensional consistency of the units or each object. Although the flowchart describes addition/subtraction, similar steps are employed for performing object comparisons such as %CH, %T, =, ==, <, >, >=, <=, etc. In the present embodiment, unit objects entered into the calculator 20 are stored in memory registers that are represented on the display 24 as levels 1-4. Each time an entry is made, the previously entered objects are moved to a higher level, such as from level 1 to level 2 in FIG. 1. The order of entry determines the unit dimension of the result, which matches those of the latest (level 1) entry. In the first step, the level 2 unit object is converted to the units of the level 1 unit object, if possible (84). Dimensional consistency is determined by comparing quantity data for the level 2 unit object against quantity data for the level 1 unit object (86). If the units are inconsistent in dimension, then the operation aborts and an error signal is flashed on the display 24 (88). If the quantity data match, the scalar part of the level 2 unit object is multiplied by an appropriate conversion factor and then added to the scalar part of the level 1 unit object to produce a scalar sum (90). The scalar sum is then combined with the unit from the level 1 object to create the resultant unit object (92).

The steps in FIG. 7 represent internal procedures similar to those shown in FIGS. 4 and 5, except for the conversion step. The process for converting the level 2 unit object works by processing each of the syntactic elements contained within the unit object. As described earlier, the syntactic elements are stored as atomic objects on the data stack. Conversion of units may also be employed independently, using predefined units or user-defined units. The unit object to be converted is entered and then the conversion process may be invoked by pressing a key or sequence of keys on keyboard 22 to select the desired unit. Dimensional consistency is checked, the scalar part of the unit object is converted to a new value, and the unit part is changed to the desired unit. For predefined units, the unit can be selected from a menu (or spelled out), as will be described with reference to FIG. 12. For compound units, the user keys in the unit, presses a specific key for such conversions, as will be described with reference to FIG. 13. The conversion process is particularly described in the pseudocode appearing in Appendix I.

4.0 The User Interface

Managing units according to the invention as described may be simplified through the provision of a menu-based user interface. The program for displaying the various menus of the interface is store in ROM 22. It is executed by the CPU 38 to display the menus on the display 24 in response to key entries from the keyboard 22.

The unit management system of the present invention supports eight unit quantities, corresponding to SI-defined fundamental base measurements; length, mass, time, temperature, amount of substance, luminous intensity, electrical current, and one extra for user-defined quantities (such as currency). All derived units (that is, units other than those in these categories) are made up of a combination of these base quantities. Regardless of the combinations of individual units in two different compound units, the compound units will be dimensionally consistent if their underlying base quantities are the same.

Figure 8A:
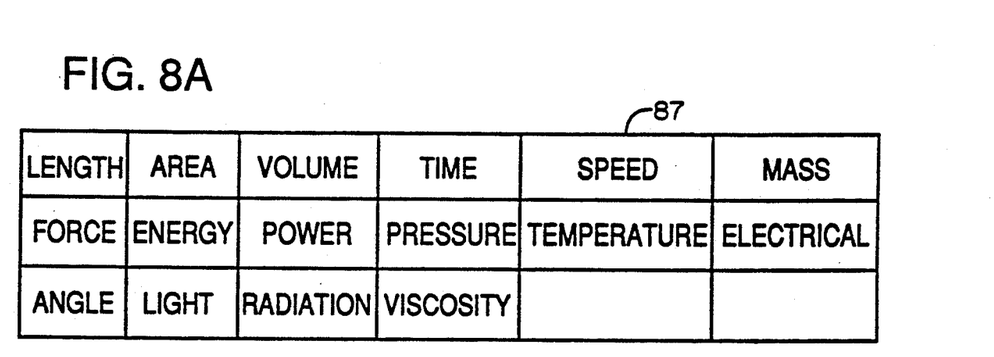
FIGS. 8A and 8B are illustrations of a user interface that appears on the display screen of the calculator of FIG. 1 for choosing units via menu keys.

FIG. 8A illustrates the first portion of a units menu 87 that is displayable on the display 24 for selecting types of units for unit objects and related units within each type. The menu 87 is shown in rows of six entries each, corresponding to the six menu keys 34 on the keyboard 22 in FIG. 1. The first row is activated by successively pressing the left shift key 28 and the units menu selection key 26 (labeled UNITS). Successive rows are activated by pressing key 32 (labeled NXT) one or more times until a row with the desired entry is visible.

Figure 8B:
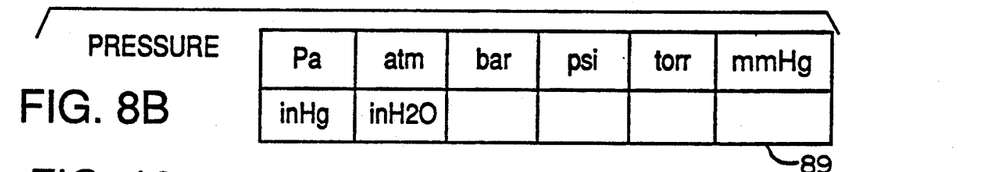

Each menu key 34 then corresponds to a second portion of the units menu, a sub-menu with entries representing physical units that fall in the category type described by the pressed menu key. For example, in the second row, menu key 34a is assigned to the PRESSURE submenu. Pressing the key 34a activates the PRESSURE submenu 89, which is shown in FIG. 8B. Submenu 89, in turn, has two rows of six entries each, each row of which may be activated by pressing the NXT key 32 a number of times.

Once a submenu such a submenu 89 has been selected, the menu keys 34 behave as follows. Pressing an unshifted menu key 34 enters into a computer register or calculating stack a normalized, predefined unit object (scalar value one) corresponding to the key label. This normalized unit object is then multiplied by a previously entered number or unit object. Thus to enter "25_psi", for example, digit keys "2", "5"are pressed to enter a scalar part into memory. Then menu key 34a for "psi" is pressed to enter the predefined unit object comprising a scalar part of value and unit part "psi" into memory,. Upon its entry, the predefined unit object is multiplied times the scalar part to create the derived unit object. Arbitrary unit powers and compound multiplicative units can be entered by successive presses of other unit menu keys.

Pressing a "convert" key (which in the present embodiment may be a simple keyboard shift key) enters a normalized unit object (scalar value 1) corresponding to the key label, then converts the first entered unit to the units specified by a following dimensionally consistent unit, returning the converted unit for further computation or conversion. Thus to convert 25° C. to Fahrenheit, press the digit keys "2", "5", "°C.", "Convert" and "°F.".

Pressing an alternate shift or "divide" key, followed by a menu key enters a normalized unit object (scalar value 1) corresponding to the key label, then executes a divide (/) of a previous unit by the following unit. This allows for the entry of compound units in which one or more unit names are to be entered in the denominator.

Figure 9:
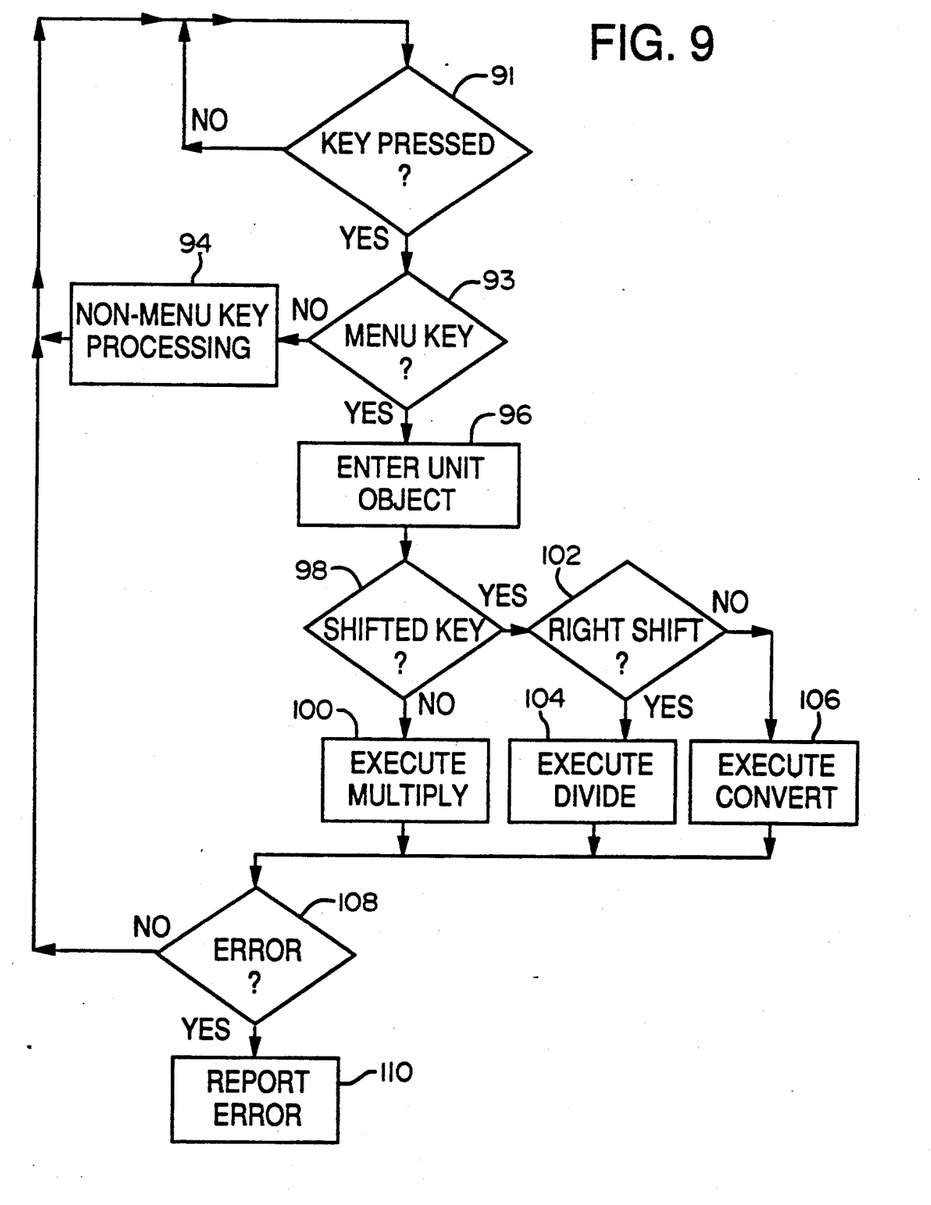
FIG. 9 is a flowchart of the unit menu key logic for selecting a unit for a unit object.

FIG. 9 illustrates the program logic defining the menu key action. With a submenu displayed, the program waits for the press of a key (91). If the key pressed is not a menu key (93), such a digit key for entering the scalar value, the key's function is carried out (94). When a menu key 34 is pressed, the scalar value is multiplied by the selected unit to create a unit object (96). Several options are now possible. If no shift key is pressed (98) before another menu key is pressed, then the present unit object is multiplied (100) by the next unit entered to create another unit for the object, such as "ft ^ 2". If the shift key 28 is pressed (102), the present unit object is divided (104) by the next unit entered to create another unit for the object, such a "m/s". If the shift key 30 is pressed, then the unit of the present unit object is converted (106) to the next unit entered, assuming it is dimensionally consistent with the present unit. If no menu key press follows, then the present unit object is complete as it is. The program has an error-reporting step (108), in which an incorrect operation is reported (110) to the user with a displayed message indicating the nature of the error.

Figure 10:
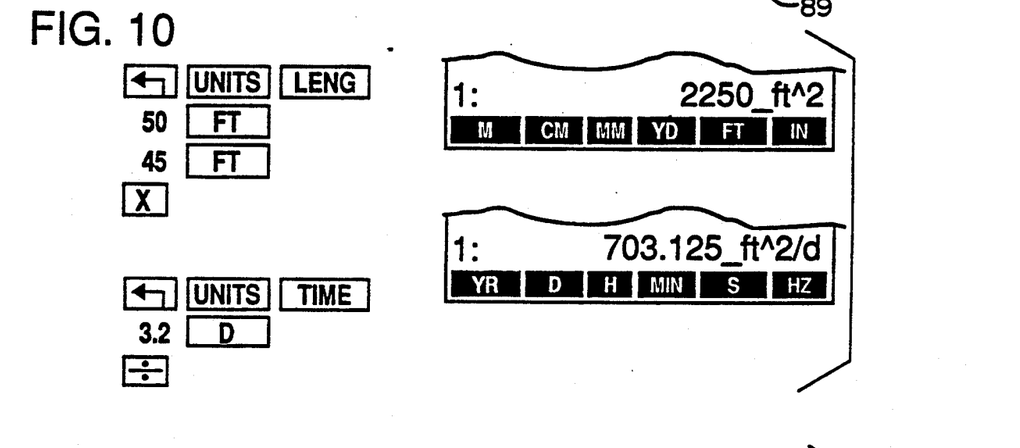
FIG. 10 is a series of screen displays showing the multiplication and division of unit objects.

How the interface works with the unit management program is illustrated by example in FIGS. 10–13. FIG. 10 is a series of screen displays showing the creation of a unit object from the multiplication and division of other unit objects. First the LENG submenu is selected and the unit objects "50_ft" and "45_ft" are multiplied together. Following the method illustrated in FIG. 4, the product "2250_ft ^ 2" is produced and displayed at level 1 on the display 24. The TIME submenu is then selected and the unit object "3.2_d" is entered and then divided into "2250_ft". The result is shown in the display 24 as "703.125_ft ^ 2/d."

Figure 11:
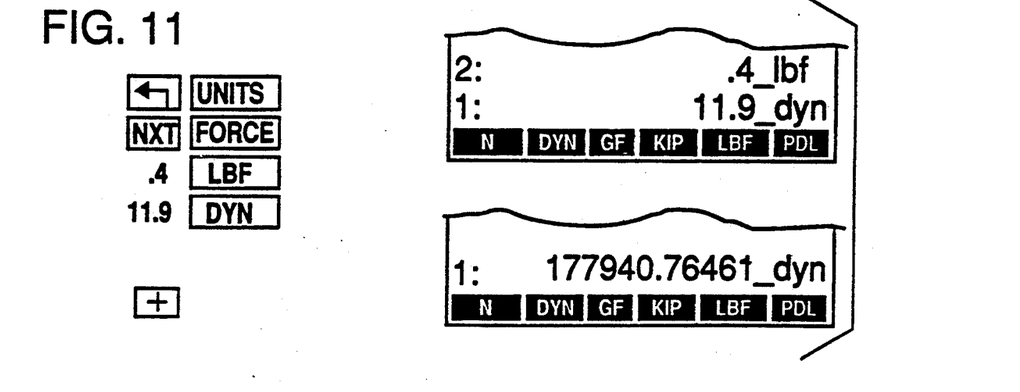
FIG. 11 is a series of screen displays showing the addition of two unit objects.

FIG. 11 is a series of screen displays showing the creation of a unit object from the addition of two unit objects. First the FORCE submenu is selected and the unit object "0.4_lbf" is entered as the first term. The second term, "11.9_dyn" is entered from the same submenu, forcing "0.4_lbf" into level 2. As the second term is being entered, the unit management program checks via the respective quantity data for dimensional consistency, which exists since both terms are from the same submenu. On pressing the addition key, the scalar of the level 2 unit object is converted to a new value based on the unit of the level 1 unit object, and the two scalars are added together to produce the sum of "177940.76461_dyn".

Figure 12:
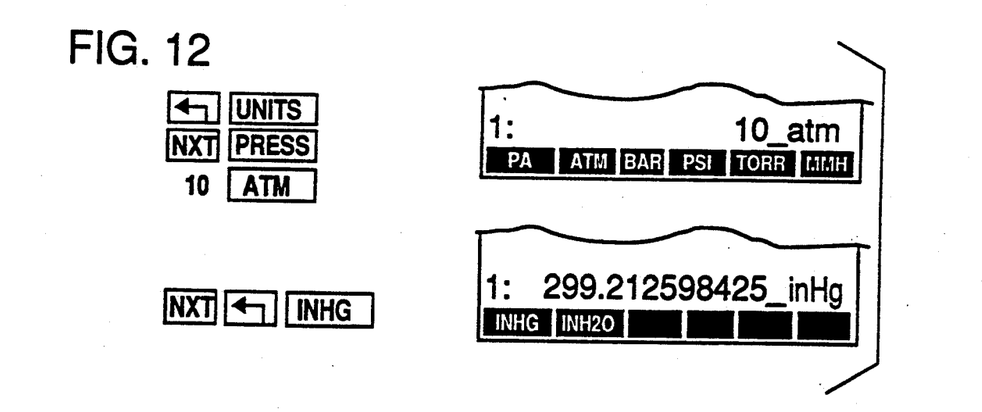
FIG. 12 is a series of screen displays showing a the conversion of a unit object from one unit to another dimensionally consistent unit that is predefined.

FIG. 12 is a series of screen displays showing a method for converting a unit object from one unit to a dimensionally consistent unit that is predefined. To convert "10_atm" to "inHg", for example, the PRESSURE submenu 86 is selected and "10_atm" is entered. To convert to inches of mercury, the appropriate row of the PRESSURE submenu is activated and then the left shift key 28 and the menu key assigned to "inHg" are successively pressed. The result is the conversion of "10_atm" to "299.212598425_inHg", as shown on display 24.

Figure 13:
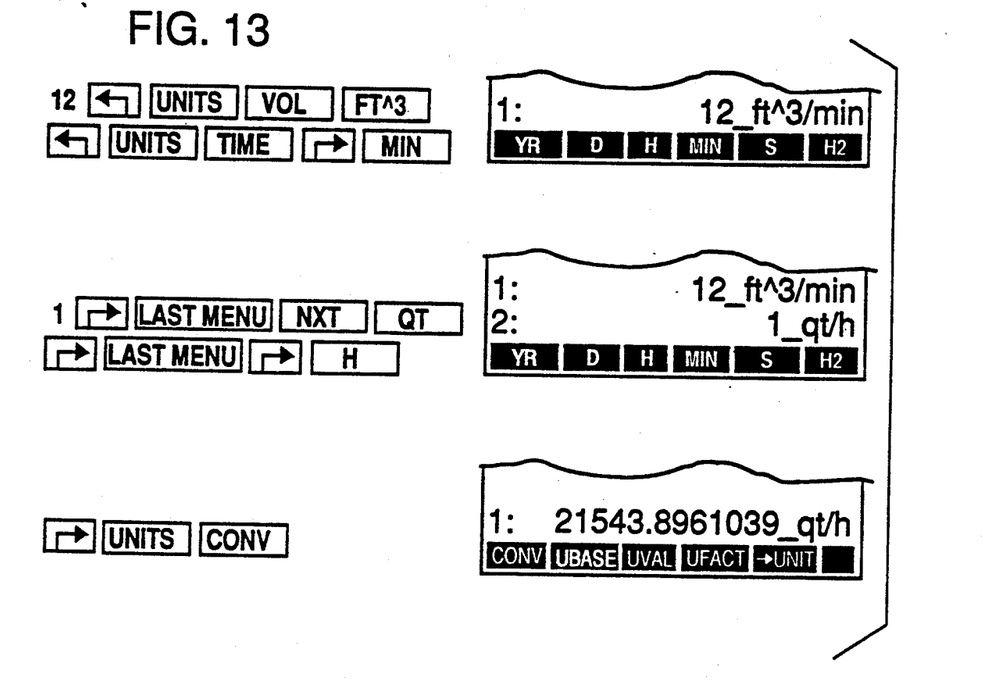
FIG. 13 is a series of screen displays showing the conversion of a unit object from one unit to another dimensionally consistent unit that is not predefined.

FIG. 13 is a series of screen displays showing a method for converting a unit object front one unit to a dimensionally consistent unit that is not predefined, such as "qt/h". A compound unit object "12_ft^ 3/-min" is entered via several submenus. A new unit expression is created by first entering a scalar to distinguish the previous entry and then the constituent unit parts of the new unit, such as "1_qt/h" in the second screen display. The level 2 unit object is the original unit object. The level 1 unit object contains the new unit expression. The number part of the level 1 unit object is ignored. The unit conversion is then executed by calling up a menu that contains a CONV label and pressing the assigned menu key 34. The conversion results in display of a mew unit object "21543.8961039_qt/h".

Having illustrated and described the principles of the invention in a preferred embodiment, it should be apparent to those skilled in the art that the invention can be modified in arrangement and detail without departing from such principles. We claim all modifications coming within the spirit and scope of the following claims.

Appendix I

Nomenclature:

```
unit_ob                     unit object
token                       element of internal
parsed RPN form of unit_ob
sc    original scalar part of a unit object
new_sc                      scalar part of new unit
object
pfx   prefix character
sf    scale factor for a prefix
cf    conversion factor for an individual unit
acf   aggregate conversion factor for a unit object
qd    quantity data for an individual unit
aqd   aggregate quantity data for a unit object
unit  provided or user-defined unit name
um^   involution operator for raising a unit to a power
um*   multiplication operator for combining units either in
      the numerator or denominator of a unit object
um/   division operator for dividing the numerator and
      denominator of a unit object
``` umP                 prefix operator for applying a scale factor (prefix)
                    to a unit name
umEND                                   marker indicating the
end of the unit object convert -- converts unit_ob1 to unit _ob2 get_base_units(unit_ob1)            (sc1, acf1, aqd1)
get_base_units(unit_ob2)            (sc2, acf2, aqd2)
if aqd1 = aqd2
then
   new_sc = sc1 * acf1 / acf2
   new_unit_ob = new_sc combined with unit part of unit_ob2
else
   issue inconsistent units error
endif get_base_units -- convert unit object to its equivalent in
base    units push sc on stack                        (scalar)
do until token = umEND
   get token
   if token = pfx                       (prefix character)
   then get_scale_factor(pfx)           (sf)
   endif if token = unit                      (unit name)
   then get_unit_data(unit)             (qd and cf)
   endif if token = umP                       (prefix operator)
   then cf = cf * sf
   endif if token = exp
   then push exp on stack
   endif if token = um^                       (involution operator)
   then
       cf = cf ^ exp
       for i = 1 to 8
           qd(i) = qd(i) * RND(exp)
       next i
   endif if token = um*                       (multiply operator)
   then
       acf = acf * cf
       for i = 1 to 8
           aqd(i) = aqd(i) + qd(i)
       next i
   endif if token = um/                       (divide operator)
   then
       acf = acf / cf
       for i = 1 to 8

```
            aqd(i) = aqd(i) - qd(i)
      next i
   endif enddo get_scale_factor -- gets the scale factor for the given
prefix   character for i = 1 to 16
   if ith prefix character from prefix table = pfx
   then
      return ith sf from table
      quit
   endif
next i get_unit_data -- gets the conversion factor to base units
and    quantity data check_provided_table(unit)
if provided unit
then
   quit
else
   get_scale_factor(unit[1])
   if first character is a prefix
   then
      check_provided_table(unit[2, length(unit)])
   endif
endif
if prefixed provided unit
then
   quit
else
   check_user_defined(unit)
   if user defined
   then
      quit
   else
      get_scale_factor(unit[1])
      if first character is a prefix
      then
         get sf from prefix table
         check_user_defined(unit[2, length(unit)])
      endif
   endif
endif
if prefixed user defined
then
   quit
else
   issue invalid unit error
endif check_provided_table -- checks if unit is in the provided
unit   table select correct section of unit table based on unit length
```

```
do until no more units of that length
   compare each unit table string with unit
   if match
   then
      get corresponding cf and qd from table
      quit
   endif
enddo check_user_defined -- checks if unit is user - defined see if unit matches a variable name
if match
then
   if variable contains a unit_ob
   then
      get_base_units(unit_ob_)
   else
      issue invalid unit error
   endif
else
   issue invalid unit error
endif
```

We claim:

1. In a calculating device, a method of managing terms having units for use in mathematical computation, comprising:
   storing in memory a first term having a scalar part and a unit part;
   storing in memory a second term having a scalar part and a unit part;
   computing a new scalar part from the scalar parts of the first and second terms;
   computing a new unit part determined directly without use of an intermediate internal data format from the unit parts of the first and second terms, the new unit part including at least one of the unit parts of the first and second terms; and
   storing in memory a new term having the new scalar part and the new unit part that results from the computation.

2. The method of claim 1 including computing the new scalar part by multiplying the scalar part of the first term by a conversion factor if the unit part of the first term differs from the unit part of the second term.

3. The method of claim 1 including computing the new unit part by checking the unit part of the first term in the computation for dimensional consistency with the unit part of the second term.

4. The method of claim 1 including computing the new unit part by converting the unit part of the first term to the unit part of the second term.

5. The method of claim 1 wherein the new unit part includes a numerator and denominator, and storing the new unit part includes cancelling identical units found in the numerator and denominator of the new unit part to simplify an expression of the new term.

6. The method of claim 1 including computing the new unit part by:
   obtaining numerator and denominator unit sequences from each term in the computation;
   computing numerator and denominator unit sequences for the new term;
   cancelling units common to the numerator and denominator unit sequences to reduce such sequences; and
   dividing the reduced numerator sequence by the reduced denominator sequence to obtain a unit sequence for the new term, the unit sequence comprising the new unit part.

7. The method of claim 6 wherein the step of cancelling units common to the numerator and denominator sequences comprises:
   transforming each of the numerator and denominator sequences into a multiple sequence;
   collecting matching multiple sequences from the numerator and denominator sequences;
   cancelling the matching sequences from the numerator and denominator multiple sequences; and
   transforming the remaining numerator and denominator multiple sequences into numerator and denominator unit sequences, respectively.

8. The method of claim 1 including:
   determining if the unit part of the second term is dimensionally consistent with the unit part of the first term;
   converting the scalar part of the second term to a new scalar value depending on how the unit part of the second term is dimensionally related to the unit part of the first term; and
   combining the converted scalar part of the second term with the scalar part of the first term.

9. A calculating device comprising:
   (a) a display;
   (b) a data entry device for entering numerical and alphabetical data; and
   (c) a processing unit for:
   combining a scalar entry and a unit entry from the entry means to create a unit object having a scalar part and a unit part;
   storing the scalar part and selected unit part as a unit object in memory of the calculating device for direct computation without use of an intermediate internal data format; and
   displaying on the display each unit object created.

10. In a calculating device including a display and a user input device, a method of creating a unit object having a scalar part and a unit part, comprising:
   entering a scalar part;
   displaying a menu of units;
   combining, in response to a selection of a unit part from the menu, the entered scalar part with the selected unit part to complete the unit object; and
   storing the scalar part and selected unit part as a unit object in memory of the calculating device for direct computation without use of an intermediate internal data format.

11. The method of claim 10 wherein the user input device is a keyboard and displaying a menu of units comprises:
   assigning a key to each unit type; and
   displaying a label for each unit type in proximity to the key to which the unit type is assigned.

12. The method of claim 10 wherein the user input device is a keyboard and displaying a submenu comprises:
   assigning a key to each related unit of the submenu; and
   displaying a label in the submenu for each related unit in proximity to the key to which the unit is assigned.

13. The method of claim 10 including converting the unit object from its original scalar and unit parts to related scalar and unit parts, the related unit part redefined within the menu of units.

14. The method of claim 10 including converting the unit object from its original scalar and unit parts to related scalar and unit parts by entering a convert command and a compound unit that is dimensionally consistent with the original unit part.

15. The method of claim 10 including creating a unit part having a denominator by entering a divide command and a unit for the denominator from a submenu.

16. The method of claim 10 wherein the displaying step comprises:
   displaying a menu of unit types; and
   displaying, in response to selection of a unit type from the menu, a submenu of related units of the selected type.

17. A calculating device comprising:
   a display;
   a data entry device for entering numerical and alphabetical data; and
   a processing unit for:
   storing a scalar part entered from the data entry device;
   displaying on the display, in response to a user request, a menu of units having a label for each unit type in the menu;
   assigning an entry point to each unit type, the label for each unit type displayed in proximity to the entry point to which the unit type is assigned;
   displaying on the display, in response to selection of a unit type from the menu, a submenu of related unit parts having a label for each related unit part in the menu;
   assigning an entry point to each related unit part, the label for each related unit part displayed in proximity to the entry point to which the related unit part is assigned;
   combining, in response to selection of a related unit part, the scalar part and selected unit part to form a composite unit object; and
   storing the scalar part and selected unit part as a unit object in memory of the calculating device.

* * * * *